United States Patent [19]
Cooper et al.

[11] Patent Number: 5,825,411
[45] Date of Patent: Oct. 20, 1998

[54] VIDEO SIGNAL ROUTING SYSTEM

[75] Inventors: Alan Neal Cooper; David William Bauerle, both of Coppell; Matthew John Fritz, Dallas, all of Tex.

[73] Assignee: Ultrak, Inc., Carrollton, Tex.

[21] Appl. No.: 702,912

[22] Filed: Aug. 26, 1996

[51] Int. Cl.[6] .................................................. H04N 7/18
[52] U.S. Cl. .......................................... 348/159; 348/512
[58] Field of Search .............................. 348/6, 159, 143, 348/153, 705, 722, 512, 513, 514, 515, 14, 15, 16, 17, 18, 19, 8, 7, 12, 13; H04N 7/10, 7/16, 7/173, 7/18

[56] References Cited

U.S. PATENT DOCUMENTS

| | | | |
|---|---|---|---|
| 3,580,998 | 5/1971 | Hammond et al. | 178/6.8 |
| 3,811,008 | 5/1974 | Lee | 178/6.6 |
| 3,900,705 | 8/1975 | Richter | 178/6.8 |
| 4,037,250 | 7/1977 | McGahan et al. | 358/108 |
| 4,051,524 | 9/1977 | Baxter | 358/108 |
| 4,091,422 | 5/1978 | Amster | 358/210 |
| 4,218,709 | 8/1980 | Baxter et al. | 358/181 |
| 4,337,481 | 6/1982 | Mick et al. | 358/105 |
| 4,511,886 | 4/1985 | Rodriquez | 348/154 |
| 4,517,593 | 5/1985 | Keller et al. | 358/107 |
| 4,577,344 | 3/1986 | Warren et al. | 348/159 |
| 4,603,352 | 7/1986 | Kaneta et al. | 358/148 |
| 4,814,869 | 3/1989 | Oliver, Jr. | 358/108 |
| 4,943,854 | 7/1990 | Shiota et al. | 358/108 |
| 4,943,864 | 7/1990 | Elberbaum | 358/108 |
| 4,945,417 | 7/1990 | Elberbaum | 358/210 |
| 4,949,181 | 8/1990 | Elberbaum | 358/210 |
| 4,954,886 | 9/1990 | Elberbaum | 358/86 |
| 4,977,449 | 12/1990 | Morgan | 358/86 |
| 4,989,085 | 1/1991 | Elberbaum | 358/108 |
| 5,001,473 | 3/1991 | Ritter et al. | 340/825.52 |
| 5,239,376 | 8/1993 | Dittmann et al. | 358/101 |
| 5,243,425 | 9/1993 | Thompson | 358/148 |
| 5,249,051 | 9/1993 | Elberbaum et al. | 358/148 |
| 5,264,929 | 11/1993 | Yamaguchi | 358/108 |
| 5,267,039 | 11/1993 | Elberbaum | 358/146 |
| 5,274,450 | 12/1993 | Elberbaum | 358/149 |
| 5,335,014 | 8/1994 | Elberbaum | 348/159 |
| 5,361,096 | 11/1994 | Ohki et al. | 348/387 |
| 5,371,535 | 12/1994 | Takizawa | 348/15 |

FOREIGN PATENT DOCUMENTS

| | | |
|---|---|---|
| 2704379-A1 | 4/1993 | France . |
| 2-109198 | 4/1990 | Japan . |
| 4-192780 | 7/1992 | Japan . |
| 4-287488 | 10/1992 | Japan . |
| WO 97/03524 | 1/1997 | WIPO .............................. H04N 7/18 |

OTHER PUBLICATIONS

Elbex, Ltd., Catalog, Serial Video Series, Oct. 1995.
Elbex, Ltd., Catalog, Framelock Series, Oct. 1993.
Elbex, Ltd., What Is I–D–Code?, Nov. 1995.

*Primary Examiner*—Christopher C. Grant
*Attorney, Agent, or Firm*—Jenkens & Gilchrist, a Professional Corporation

[57] ABSTRACT

A video signal routing system includes a video signal carrying line arranged in a loop beginning and ending at a signal multiplexer, a plurality of video cameras electrically connected to the line at points spaced therealong, and a video output line connected to receive video signals from the multiplexer. A synchronization signal insertion device and a code signal insertion device are located in the video signal carrying line adjacent the beginning of the loop between the multiplexer and the cameras. A duplicate synchronization signal insertion device and a duplicate code signal insertion device are located in the video signal carrying line adjacent the end of the loop between the multiplexer and the cameras. A timing generator and interface receives signals from a synch detector and a video level detector in the video output line and is controlled by a microcontroller. The microcontroller and the timing generator and interface control the synchronization signal insertion device, the code signal insertion device, the duplicate synchronization signal insertion device, and the duplicate code signal insertion device.

4 Claims, 1 Drawing Sheet

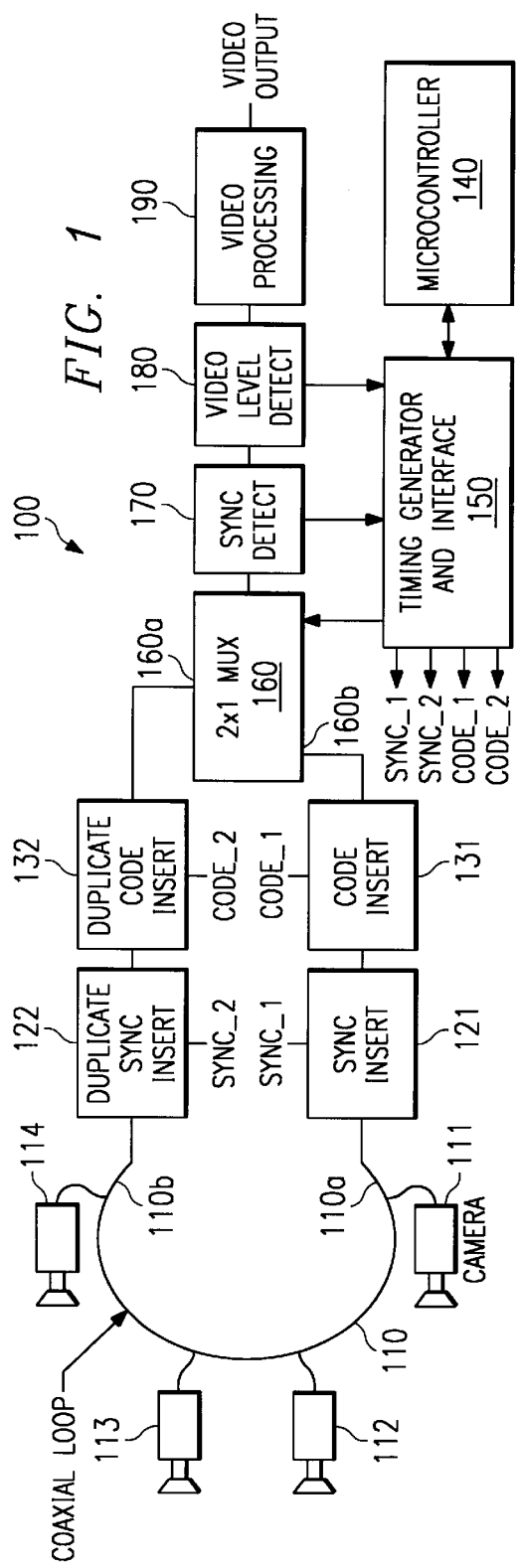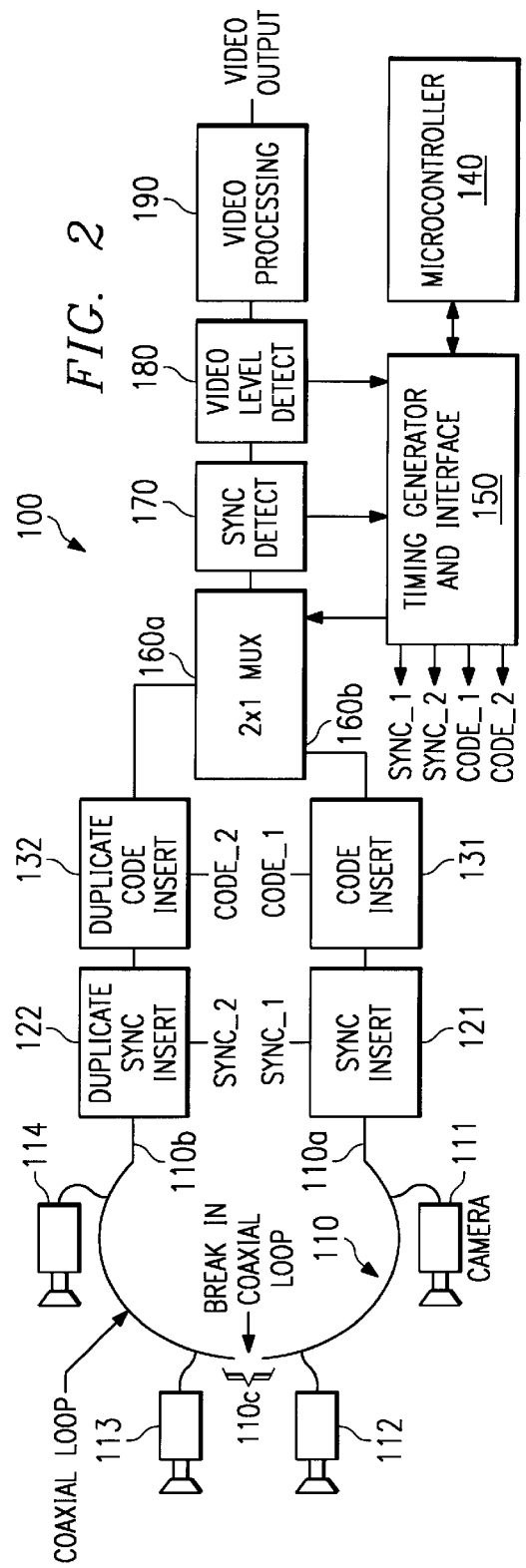

VIDEO SIGNAL ROUTING SYSTEM

BACKGROUND

The present invention relates to systems for routing video signals, and more particularly, to systems for routing video signals from a single loop of cable.

In a video system such as a video multiplexing system where there are multiple cameras on a single loop of wire, the loop system can lose video from some or all cameras if the loop of coax is broken or somehow disconnected. Therefore, there is a need for a video routing system that can prevent the loss of video signals when the loop of coax is interrupted.

SUMMARY OF THE INVENTION

In accordance with the invention, a video signal routing system for video signals which is adapted to remain operative despite a break in the video signal carrying line is provided. It includes a video signal carrying line arranged in a loop beginning and ending at a signal multiplexer and a plurality of video cameras electrically connected to said line at points spaced therealong. It also includes a video output line connected to receive video signals from said cameras through said multiplexer for display. There is a synchronization signal insertion device in said video signal carrying line adjacent the beginning of its loop between said multiplexer and said cameras and a code signal insertion device in said video signal carrying line adjacent the beginning of its loop between said multiplexer and said cameras. In addition, there is a duplicate synchronization signal insertion device in said video signal carrying line adjacent the end of its loop between said multiplexer and said cameras as well as a duplicate code signal insertion device in said video signal carrying line adjacent the end of its loop between said multiplexer and said cameras. A timing generator and interface responsive to control signals derived from said video output line is provided for controlling both of said synchronization signal insertion devices and both of said code signal insertion devices, and a microcontroller is provided for controlling said timing generator and interface.

BRIEF DESCRIPTION OF THE DRAWINGS

These and other features, aspects and advantages of the present invention will become better understood with regard to the following detailed description, appended claims, and appending drawings where:

FIG. 1 is a block diagram of a video multiplexing system incorporating one embodiment of the present invention; and FIG. 2 is a block diagram demonstrating the multiplexing system in FIG. 1 with a break in the coaxial loop.

DETAILED DESCRIPTION

Referring now to the figures, there is shown a multiplexing system 100 illustrating one embodiment of the present invention. The video multiplexing system 10 generally comprises a coaxial loop of cable 110 having video cameras 111–114 connected thereto, sync inserters 121, 122 for inserting synchronization signals on the coaxial loop 110, code inserters 131, 132 for inserting control codes on the coaxial loop 110, a loop multiplexer 160 for receiving signals from the coaxial loop 110, a sync detector 170 for detecting synchronization signals on the video from the loop multiplexer 160, a video level detector 180 for detecting video levels on the video signal from the loop multiplexer 160, a video processor 190 for processing the video from the loop multiplexer 160, and a timing generator and interface 150 and a microcontroller 140 for controlling the various components of the multiplexing system 100.

When the coaxial loop 110 is connected properly, as shown in FIG. 1, the control codes and synchronization signals are inserted onto a first end 110a of the coaxial loop 110 by the code inserter 131 and the synchronization inserter 121, respectively. As the synchronization signals and control codes propagate from the first end 110a of the coax loop 110 to a second end 110b, the cameras 111–114 receive the synchronization signals and the camera codes. The cameras 111–114 use the synchronization signals on the coaxial loop 110 to synchronize the signals of the cameras 111–114. The camera codes on the coax loop 110 provide information to the cameras 111–114 such as which camera is to insert signals onto the coaxial loop 110 and at which times to build or insert a video signal on the coaxial loop 110. In one embodiment, the multiplexing system 100 uses the synchronization signals and the control codes to build a composite video signal onto the coaxial loop 110 in the same manner as in the co-pending U.S. patent application Ser. No. 08/501,261, entitled "VIDEO MULTIPLEXER", filed on Jul. 11, 1995, assigned to the assignee of the present invention, which is hereby incorporated in its entirety by reference thereto. The resulting video signals are received at the second end 100b of the coaxial loop 110 by a first input 160a of the loop multiplexor 160. During the period in which the video signals are being received from the second end 110b of the coaxial loop 110, the synchronization inserter 122 and code inserter 132 pass video from the second end 110b of the coaxial loop to the loop multiplexer 160.

When a break 110c in the coaxial loop 110 exists, the video signal received at the second end 110b of the coaxial loop 110 is disrupted. Synchronization signals from the synchronization inserter 121 are received only by the cameras 111–112 before the break 110c in the coaxial loop 110. The cameras 113–114 of the break 110c in the coaxial loop 110 will not be able to synchronize to the system because they do not receive the synchronization signal from the synchronization inserter 121. Also, control codes from the code inserter 131 are received only by the cameras 111–112 before the break 110c in the coaxial loop 110. The cameras 113–114 will not sense when the respective camera is to build or insert video signals onto the coaxial loop 110 because they do not receive the control codes from the control code inserter 131. Furthermore, although the cameras 111–112 before the break 110c in the coaxial loop 110 receive the synchronization signals and control codes from the synchronization inserter 121 and the code inserter 131, respectively, any video built or inserted on the coaxial loop 110 by those cameras is not received at the second end 110b of the coaxial loop 110 by the first input 160a of the multiplexer 160 due to the break 110c in the coaxial loop 110.

There are several ways to detect a break in the coaxial loop 110. In one embodiment, the microcontroller 140 determines if a break exists in the coaxial loop 110 by using the video level detect 180 to count the number of cameras 111–114 that are not responding to their corresponding control data codes inserted on the first end 110a of the coaxial loop 110 by the code inserter 131. If none of the cameras 111–114 are responding, then it is assumed that the coaxial loop 110 is broken. In another embodiment, the microcontroller 140 determines if a break exists in the coaxial loop 110 by using the sync detect 170 to verify the absence of the synchronization signal inserted onto the first end 110a of the coaxial loop 110 by the sync insert 121, at the second end 110b of the coaxial loop 110. If the coaxial loop 110 is broken, as in FIG. 2, then no synchronization signal is present at the second end 110b of the coaxial loop 110 for the sync detect 170 to detect.

If it is determined that the coaxial loop 110 is broken, as in FIG. 2, the synchronization signals and control codes are inserted onto both ends 110a and 110b of the coaxial loop using the sync inserter 121 and the duplicate sync inserter 122, and the code inserter 131 and the duplicate code inserter 132. The microcontroller 140 uses the video level detect 180 to check each end 110a or 110b of the coaxial loop 110 for the presence of a video signal when a camera code for a particular camera is commanded. The microcontroller 140 keeps track of which end 110a and 110b of the camera loop 110 that video is detected in response to a particular camera code for a particular camera. After a configuration period of time, the microcontroller 140, through the timing generator and interface 150, then selects the appropriate end 110a and 110b of the coaxial loop 110 for each of the cameras 111–114 using the multiplexer 160 to receive the videos from the corresponding camera, and sends the video from the multiplexer 160 to the video processor 190 for processing into an output.

Video received in a broken loop preferably has a phased-shift correction to correct the phase shift due to receiving the video on the same end 110a and 110b of the coaxial loop 110 that the synchronization signal is inserted. The phase error can be corrected using the method described in the co-pending application filed concurrently herewith as Attorney Docket No. 27761-00054 entitled "PHASE COMPENSATION FOR VIDEO CAMERAS", assigned to the assignee of the present invention, which is hereby incorporated in its entirety herein by reference thereto. The amount of phase compensation will be different for each camera and will be greater for the furthest camera from the loop multiplexer 160, i.e., the cameras closest to the break in the loop 110.

After the coaxial loop 110 is broken, the coaxial cable is no longer properly terminated with a termination resistor. To prevent the termination of the cameras closest to the break 110c in the coaxial loop 110 from being a manual job, a method of automatic termination must be used. In the automatic termination, each camera 111–114 must have the ability to receive a "terminate" command and terminate its input with a termination resistor in response thereto. In one embodiment, the cameras 111–114 receive the "termination" command as serial data generated by the microcontroller 140 through the timing generator 150 and inserted by the code insert 121, 122. In this embodiment, the camera receives the "termination" 21 command in the vertical blanking interval of the video in the same manner as the phase up/phase down/phase neutral signal is received by the camera in the co-pending application entitled "PHASE COMPENSATION FOR VIDEO CAMERAS", previously referenced above and incorporated in its entirety by reference thereto. However, to send a termination command to the proper camera 111–114, the microcontroller 140 must know which one of the cameras 111–114 are closest to the break 110c.

In one embodiment, the microcontroller 140 is preprogrammed to know the order of the cameras 111–114 from the first end 110a of the coaxial loop 110 to the second end 110b. By knowing which cameras 111–114 are active on which ends 110a and 110b of the coaxial loop 110, the microcontroller 140 can send the appropriate terminate commands to the cameras closest to the break 110c. However, this method requires that the cameras be installed in a certain order. In another embodiment, the microcontroller 140 keeps track of which cameras 111–114 require the most phase correction by the video processor 190. The cameras that are closest to the break 110c in the coaxial loop 110 will require the most phase compensation. Therefore, the microcontroller 140 would send termination signals to the cameras 111–114 that require the most phase compensation by the video processor 190.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A video signal routing system for video signals comprising:

a video signal carrying line arranged in a loop having a beginning and an end at a signal multiplexer;

a plurality of video cameras electrically connected to said line at points spaced therealong;

a video output line connected to receive video signals from said cameras through said multiplexer for display;

a synchronization signal insertion device in said video signal carrying line adjacent the beginning of the loop between said multiplexer and said cameras;

a code signal insertion device in said video signal carrying line adjacent the beginning of the loop between said multiplexer and said cameras;

a duplicate synchronization signal insertion device in said video signal carrying line adjacent the end of the loop between said multiplexer and said cameras;

a duplicate code signal insertion device in said video signal carrying line adjacent the end of the loop between said multiplexer and said cameras;

a timing generator and interface responsive to control signals derived from said video output line for controlling said synchronization signal insertion device, said code signal insertion device, said duplicate synchronization signal insertion device, and said duplicate code signal insertion device; and a microcontroller for controlling said timing generator and interface.

2. The video signal routing system as in claim 1, further including a sync detector in said video output line, said sync detector sending said control signals to said timing generator and interface for verifying when an absence of a synchronization signal exists on said video output line.

3. The video signal routing system as in claim 1, further including a video level detector in said video output line, said video level detector detecting video levels on said video output line and sending said control signals to said timing generator and interface indicating if a video signal is present on said video output line.

4. The video signal routing system as in claim 1, further including:

a sync detector in said video output line, said sync detector sending a first control signal to said timing generator and interface for verifying when an absence of a synchronization signal exists on said video output line; and a video level detector in said video output line, said video level detector detecting video levels on said video output line and sending second control signal to said timing generator and interface indicating if a video signal is present on said video output line.

* * * * *